Jan. 22, 1957 E. H. BRADLEY 2,778,886

DISTRIBUTED TRIODE AMPLIFIERS

Filed Dec. 30, 1952

INVENTOR.
EMMETT H. BRADLEY
BY [signature]
ATTORNEY

United States Patent Office 2,778,886

Patented Jan. 22, 1957

2,778,886

DISTRIBUTED TRIODE AMPLIFIERS

Emmett H. Bradley, Alexandria, Va., assignor to Melpar, Inc., Alexandria, Va., a corporation of New York Application December 30, 1952, Serial No. 328,598

12 Claims. (Cl. 179—171)

The present invention relates generally to amplifiers, and more particularly to distributed amplifiers employing triode vacuum tubes as amplifying elements.

Distributed amplifiers, employing pentodes as amplifying elements, are well known and commercially available. Due to transit time and grid loading effects present in available pentodes, distributed amplifiers employing them have an apparent upper cut-off limit at about 400 mc. It is known that triodes can be designed for high frequency operation, say to 1500 mc., and their use in distributed amplifiers might therefore be expected to result in an increase in the upper cut-off frequency of such amplifiers.

However, the conventional or known distributed amplifier operates, in accordance with the best opinion, only in virtue of the complete isolation of the input and output circuits thereof, and it is for this reason that it has always been the opinion of those skilled in the art that pentode amplifier tubes must be employed in distributed amplifiers. It was expected, if triodes were employed as amplifying elements in a distributed amplifier, that the plate to grid capacities of the tubes, Cgp, would render the amplifier unstable, and would introduce other harmful effects, by virtue of feedback from output line to input line through Cgp. It therefore appeared that the use of triode tubes in distributed amplifiers was not feasible, unless some satisfactory means could be developed for decoupling between the grid and plate lines, or for compensating for the existing coupling in some fashion, as by means of inverse coupling, but in view of the extremely wide bands of frequencies to be amplified, say from 0 to 1,000 mc., this seemed to be an impossibility.

I have, however, devised and constructed distributed amplifiers employing triodes as electronic amplifier elements, in which external coupling between the grid and plate lines may be provided, in addition to that provided through the grid-plate capacity of the triodes, and which are extremely stable and linear.

In the conventional distributed amplifier a pair of mutually isolated two-conductor transmission lines is employed, which have identical phase propagation constants. Pentode tubes are employed, one conductor of each transmission line is grounded, and the cathodes of the pentodes are grounded. The ungrounded conductor of one of the transmission lines is then connected at spaced points to the anodes of the pentodes, and the ungrounded conductor of the other transmission line is connected to the control grids, at like points. The lines are both terminated in their characteristic impedances, to prevent reflections, and the plate circuits of the tubes and the plate line completely isolated from the grid circuits and the grid line, both externally of the tubes and internally of the tubes. The lines are so designed, in respect to tube capacities especially, that the latter forms parts of the lines, so that the tube capacities introduce negligible discontinuities into the lines.

One mode of constructing triode distributed amplifiers, in accordance with a preferred embodiment of my invention, can best be explained by considering that each triode is connected to three conductors, which, considered in pairs, represents three transmission lines. If the conductors connected to cathodes, grids and plates are respectively designed K, G, P, the lines are KG, GP, and PK. In this connection K will normally be an extended ground plane. Triodes are connected along the lines, with cathodes, grids and anodes connected to K, G and P, respectively. With the line pairs are thus associated the capacities of the tubes, i. e. $C_{KG}$, $C_{GP}$, $C_{PK}$, and these latter capacities are not the physical capacities of the tube when static, but the operating capacities, taking account of Miller effect. All three line pairs are then designed to minimize discontinuities when tube capacitances are taken into account, and all to have the same phase propagation velocity. The remaining novel factor is that supplementary coupling may be deliberately introduced or inherently available between plate and grid conductors. It is then found that amplification is obtained without instability, to far higher frequencies than had hitherto been considered feasible, and, in particular quite flat amplification has been obtained from D.-C. to about 1000 mc.

In one actual structure employed, no lumped constants appear, except those present in the tubes, and the grid conductor was in the form of a flat strip of metal, having suitable apertures for grid flanges. The cathode conductor was in the form of a pair of parallel wires, straddling the anode terminals of the tubes, and soldered thereto. This latter structure is the full equivalent of a suitably dimensioned single metal strip. The cathode conductor was an extended ground plane. No attempt was made to shield the conductors from one another, and accordingly there was both capacitive and inductive coupling between plate and grid conductors, i. e., the system was essentially a three conductor transmission line which is in turn equivalent to three two conductor lines having all the lines intercoupled. The character of this coupling is, in the structure described, extremely complex, i. e. it is capacitive as well as inductive, in some degree directional, especially at the higher frequencies, and due to both transmission line and antenna modes of propagation along the line. The characteristics of the amplifier can be modified by modifying this coupling, but the wide band stability characteristics of the system do not appear to be unduly critical in respect to this coupling, so long as the phase propagation constants of all three line pairs are maintained equal, so long as discontinuities in the line due to tube capacities are minimized by proper line design, and so long as the gain is not unduly high and the tubes not spaced too far apart.

I call the type of amplifier hereinabove briefly described a three dimensional distributed amplifier, because its circuit diagram can best be presented as a three dimensional structure, to show all the couplings involved.

Once the concept is available of providing a stable wide band amplifier having coupling between plate and grid lines, through tube capacities and exteriorly of the tubes, it will appear that either end of the grid line may be employed as an input, and the other end as an output, or that the amplifier is bi-lateral, and that output signal may be derived from either the plate line or the grid line, or both, and in opposite phase on the separate lines, to provide a push-pull or phase-inverted output.

While the systems heretofore briefly described employ triode amplifier tubes, generally, and in which the cathodes of the tubes are grounded, it is entirely feasible to operate the tubes with grounded grids, which has been found to lead to minimization of deleterious effects due to tube lead inductance and transmit time effects, and also to minimize coupling between plate and cathode lines through the tube capacitances, i. e. to minimize lumped coupling, and thereby discontinuities in the transmission lines of the amplifiers.

While open wire lines have been extensively employed by me in triode distributed amplifiers, I find that shielded lines are preferable, in that they radiate less, and are easier to design, because more nearly symmetrical. To this end I may employ coaxial conductors, grounding the outer conductor, and connecting the inner line into the amplifier. The design eliminates much of the unpredictability which inheres in respect to couplings between open wire transmission lines, so that designs may be mathematically predicted with considerable dependability, and this expedient may find application both in triode and pentode distributed amplifiers.

While the theory of the amplifiers herein described is necessarily obscure, so that I do not wish to be bound to any specific theory, nor responsible for the accuracy of any theory which may be promulgated, it is my belief that the operability of the system is dependent, at least at the higher frequencies, on the fact that energy, transferred from the plate line of the amplifier to the grid line, is directionally fed in considerable degree, so that differential attenuation occurs as to wave energy traveling back toward the input end of the amplifier, and as to wave energy traveling in the direction of the output terminals of the amplifier. At lower frequencies I believe the amplifier operates more nearly like a set of parallel tubes, since the electrical delay from tube to tube is very small, and in such case the phase of the feed-back energy is not proper to cause oscillations, this requiring a predominantly inductive load for the tubes. In this connection it is well known that feed-back taking place around a single stage ordinarily does not introduce difficulty due to oscillations, unless the stage is inductively loaded, and at the lower frequencies, in the system of the present invention, the parallel operated tubes, placed physically close together, are electrically almost equivalent to a single tube, so far as feed-back effects are concerned. At the upper end of the pass band of the amplifier advantage is taken of the relatively low grain of even a plurality of stages of distributed amplification, and of the relatively slight electrical distance or phase between the output of the last tube, and the input of the first tube, plus whatever directional transmission effects may be taking place. It is known that the value of AB determines whether or not oscillations will take place in an amplifier having feed-back, where A is amplifier gain and B the fraction of voltage fed back to the input of the amplifier via the feed-back path. If both A and B are kept low, oscillations will not occur. The gain obtainable with six tubes in my system is about 5, and the value of B as determined by interelectrode and transmission line coupling and other factors, may be relatively small. So long as B taken between the first and last tubes, is less than .2 there seems to be no danger of oscillations for the stated gain. In addition oscillations occur only if the phase of the fed-back voltage is correct, i. e. regenerative. The structure employed is such that the distance electrically between the first and last tube of the amplifier reaches ½ wave length only at the uppermost frequency of the amplifier, i. e. about 1,000 mc.

It will be evident then that every factor of design of amplifiers incorporating my invention conspires to avoid instability, and in fact oscillations do not occur in practice, whatever the reason, and the amplifier is stable over the band 0–1000 mc., approximately.

It is a primary object of the present invention to provide a distributed amplifier which employs triode tubes as amplifying elements.

It is a further object of the present invention to provide a triode distributed amplifier of the three dimensional type.

It is another object of the invention to provide a triode distributed amplifier employing distributed constant transmission lines as circuit elements.

Still another object of the invention resides in the provision of a triode distributed amplifier having three transmission line conductors, forming three transmission lines, one of the conductors connected to the plates of the amplifier tubes, and the remaining conductors to the grids and cathodes respectively.

It is a further object of my invention to provide a triode distributed amplifier of the grounded grid type, in which the grids of the amplifier tubes are all grounded, and the cathodes and plates connected to conductors of transmission lines.

It is another object of my invention to provide a phase inverter triode distributed amplifier.

Another object of the invention resides in the provision of a bi-lateral distributed amplifier.

The above and still further features, objects and advantages of the present invention will become evident on consideration of the following detailed disclosure of specific embodiments thereof, especially when taken in connection with the accompanying drawings, wherein.

Figure 1:
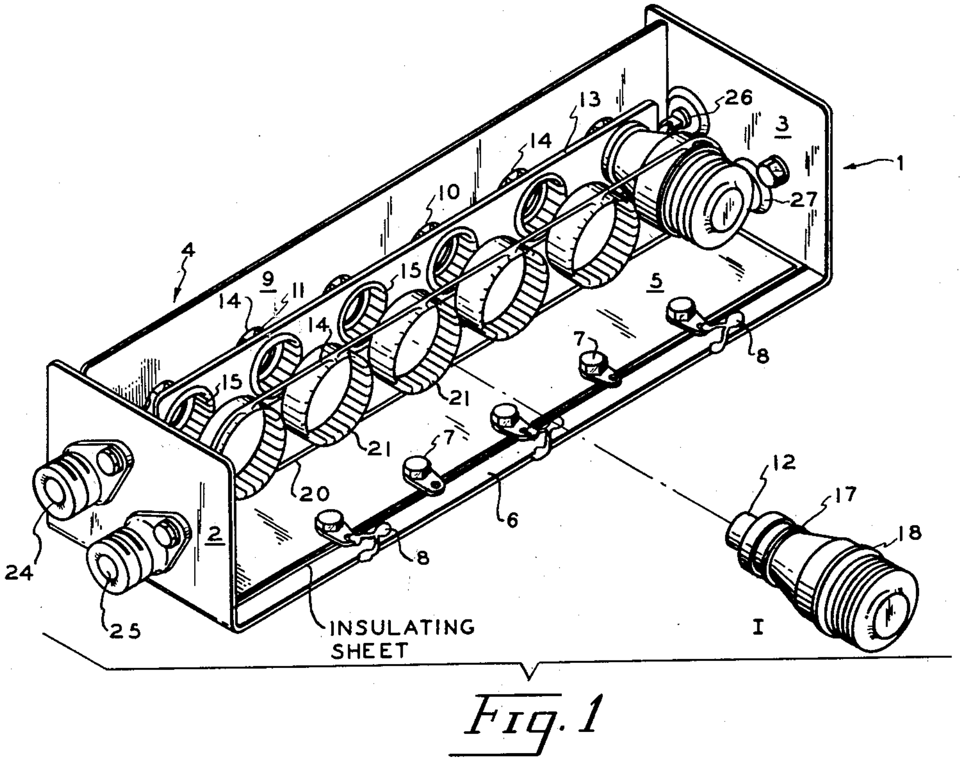
Figure 1 is a view in perspective of the physical structure of a triode distributed amplifier in accordance with one embodiment of the invention.

Referring now more specifically to the accompanying drawings, the reference numeral 1 identifies a U-shaped metallic frame, to the upstanding end members 2, 3, of which are secured the necessary high frequency or coaxial connectors of the system. An L-shaped bracket 4 is provided, having one arm 5 insulatedly bolted to the base 6 of the frame 1, by means of bolts 7, and also coupled thereto at a plurality of places, by capacitors 8. The other arm 9 of the L-shaped bracket 4, normally vertical, has about the same height as the end members 2, 3, and is provided with a plurality of cathode apertures 10, each of which is provided with a generally U-shaped elastic clip, as 11, for securing and making firm contact with the cathodes as 12, of a triode vacuum tube T. Specifically I employ Eimac type 2C39A tubes, in the design, although other similar tube types may be employed, by resorting to appropriate modifications in mechanical design.

By virtue of the extended area of the L-shaped bracket 4, this element of the device provides a ground plane, so that in Figure 1 the triodes are operated with cathodes grounded. This ground plane constitutes, however, one conductor of a three conductor transmission line, the other conductors of which are the grid conductor 13 and the plate conductor 20.

The grid conductor 13 is constituted of a flat metallic strip, oriented parallel with the vertical arm 9 of the L-shaped bracket 4, and provided with apertures aligned with the cathode apertures 10. In each of the apertures is secured a cylindrical contactor 15 having a plurality of spring fingers distributed about its periphery, and extending inwardly of the contactor. The grid flanges, as 17, of the tubes T, are pressed within the contactors 15, and thereby make firm contact with the grid line 13.

The anode connections 18 of the tubes T are constituted of metallic cylinders, having larger diameters than the grid flanges. A pair of parallel metallic rods 20 are provided, between which are supported the anode contactors 21, which are quite similar in mechanical structure to the grid contactors 15. The anode contactors 21 are coaxial with both the grid contactors 15 and the cathode connectors 11. The parallel rods 20 are reasonably equivalent, taken together, to a flat metallic strip, and their cross section is relatively critical, as determining their inductance per unit length.

Secured to each of upstanding end members 2, 3 of U-shaped frame 1, is a pair of conventional coaxial connectors. The input connectors 24, 25 have their center conductors connected to grid and plate conductors 13, 20 respectively, and their outer cylindrical conductors grounded to the upstanding member 2. The output connectors 26, 27 are similarly mounted and connected.

Figure 2:
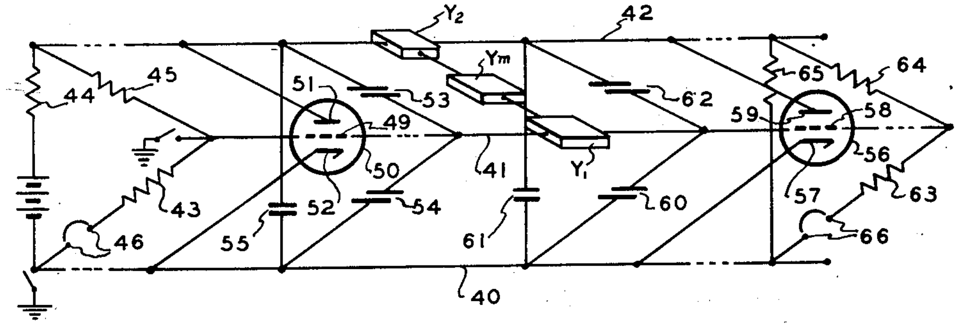
Figure 2 is a view of a triode three dimensional amplifier employing triodes, in schematic form and generally corresponding with the structure of Figure 1.

The electrical structure of Figure 1, together with its electrical characteristics and possible modes of connection to input signal sources and output loads, will be better understood by reference to the schematic circuit diagram of Figure 2.

Referring now more particularly to Figure 2 of the accompanying drawings, the reference numeral 40 identifies a ground plane, which may be considered one conductor of a transmission line, following current practice. The reference numeral 41 identifies a grid conductor, and the reference numeral 42 a plate or anode conductor. Resistors 43, 44, 45 respectively bridge between the conductor pairs 40—41, 40—42 and 41—42, at their input end, and are selected to have values equal to the characteristic impedances of the respective conductor pairs. A source of signal may be connected at terminals 46, in series with resistance 43, i. e. between ground and the grid conductor 41.

Connected in series with the grid conductor 41 is the grid electrode 49 of a first vacuum tube, 50. The corresponding plate electrode 51 is connected directly to the plate conductor 42, and the cathode 52 directly to the ground conductor 40. The condensers 53, 54, 55 represent the inter-electrode capacities of the triode tube 50, and in particular it should be noted that capacitive coupling exists between plate conductor 42 and grid conductor 41 via the internal capacity C*gp* of the tube, represented by capacity 53. In addition, however, both capacitive coupling and inductive coupling exists between the physical structures of the grid and plate lines. The coupling is due to all modes of transmission along the line, i. e. both transmission line and antenna modes.

A second triode vacuum tube 56 is connected farther along the lines, with its cathode 57, grid 58 and anode 59 connected respectively to the cathode grid and anode conductors 40, 41, 42, respectively. The spacing between the tubes is made physically as small as possible, especially if a considerable number of tubes is to be employed, as in the physical structure of Figure 1, so that the phase shift along the line between the first and last tubes of the amplifier shall be as small as possible and probably less than ½ λ at the highest frequency for which the amplifier is designed. Condensers 60, 61, 62 represent interelectrode capacities of the second tube, 56. The three conductor pairs 40—41, 41—42 and 42—40 are terminated by resistances 63, 64, 65, respectively, which represent the characteristic impedances of the conductor pairs involved. In this respect it should be noted that these lines have non-identical characteristic impedances and must be designed to have identical phase propagation constants, and their design must conform to the lumped impedances present, so as to minimize discontinuities.

The structure of Figure 2, as discussed to this point, represents electrically two sections of the physical system illustrated in Figure 1.

As an improvement, it is possible to add in the lines 41 and 42, respectively, impedances of one character or another, represented at Y1 and Y2. These impedances may be coupled by a mutual impedance $Y_m$. Specifically Y1 and Y2 may be loops or coils, and $Y_m$ the mutual inductance thereof, so that lines 41 and 42 will be more closely coupled than is feasible in the structure of Figure 1. However, I do not desire to be limited in respect to the structure of Y1, Y2, $Y_m$, since a single closed loop conductively related to both of lines 41, 42 may be most advantageously employed, or some still more complex network. It is necessary to avoid resonances with tube capacities, in designing Y1, Y2, $Y_m$, and this must in fact be done largely empirically. In general, however, it is believed that directional coupling effects result from the various inductive and capacitive couplings, which tend to reduce feed-back toward the reverse end of the amplifier, and thus contribute to stability, or enable use of a larger number of tubes and greater gain before instability ensues.

To show why directional coupling effects may be expected, in a rough way, note that unequal currents may be expected, in condensers 54, 60, with the current in 60 predominating, because this capacity is associated with the second, rather than the first tube of the stage. These currents will be roughly in quadrature with the line voltages, assuming relatively small grid-cathode resistances. In the loop comprising Y1, the condensers 54, 60 and the ground plane between the condensers 54, 60, these currents oppose. On the other hand the voltage induced in Y, tends to drive a circulating current around the loop, and generally having a quadrature component, which combines with the capacitively induced currents. With proper values of circuit constants, voltage across 54 may be made less or more, in response to current through condenser 60, and hence feed-back toward the input of the system controlled. The present qualitative explanation is all that is currently available, because of the many factors involved, such as grid loading due to transit time, phase displacement effects, Miller effects, uncalculatable coupling, and the like. On the other hand it is also possible so to design the coupling circuits, or so to select the coupling factors, that increased feed-back occurs in the direction of the input end of the amplifier, to overcome normal degenerative effects.

Due to the fact that amplified energy travels down the grid-ground line 41—40, as well as down the plate-ground line 42—40, amplified signal may be derived across any of resistors 63, 64, 65, or across two of these simultaneously. In the latter case paraphase output is available. Also since the amplifier is completely symmetrical looped at from either end, it is a bilateral amplifier, i. e. input signal can be inserted not only at terminals 46, but these terminals may be bridged, and terminals 66 employed as input, output being derivable from any one or more resistors 43, 44, 45.

As a further modification, it will be realized that ground may be placed at either grid or cathode lines, in the system of Figure 2. This would require, for grounded grid operation, a modification of the physical structure of Figure 1, to provide an extensive ground plane in place of grid conductor 13, and a relative narrow strap at the cathodes, in place of the extensive ground plane 9 there employed in Figure 1. Grounded grid operation is particularly advantageous in triode distributed amplifiers, because it enables maximum grid circuit shielding, the only coupling present between plate and grid circuits being internal of the tubes, via C*gp*. External coupling may then be added, in accurately controlled values. Also, internal capacity C*gp* is minimized, and grid loading reduced, by this expedient.

While I have described and illustrated preferred specific embodiments of my invention, in accordance with the requirements of the applicable statutes, it will be realized that variations of structural and circuit detail may be resorted to without departing from the true spirit of the invention, as defined in the appended claims.

What I claim is:

1. A triode distributed amplifier, comprising a rectilinear anode conductor, a rectilinear grid conductor, a rectilinear cathode conductor, said conductors all subsisting in parallel planes, a plurality of at least three triode vacuum tubes each having a cathode, an anode and only a single grid electrode intermediate the anode and cathode, planar external terminals for said anodes, cathodes and grid electrodes, said planar external terminals subsisting respectively in said parallel planes, means connecting said anode terminals at phase distributed points directly to said anode conductor, means connecting said cathode terminals at like phase distributed points directly to said cathode conductor, and means connecting said grid terminals at like phase distributed points directly to said grid conductor, terminals for a source of signals having components within the band 0–1000 mc./s. connected between said cathode conductor and said grid conductor adjacent one end of these, and at least one output load connected between one pair of said conductors adjacent the other end thereof.

2. A triode distributed amplifier comprising a rectilinear anode conductor, a rectilinear grid conductor, a rectilinear cathode conductor, a plurality of at least three triode vacuum tubes each having an anode, a cathode, and a grid located intermediate said anode and cathode, means connecting said anodes respectively at phase distributed points along said anode conductor, means connecting said cathodes at like distributed points along said cathode conductor, and means connecting said grids at like distributed points along said grid conductor, terminals for a source of signals having components within the band 0–1000 mc. connected between said cathode conductor and said grid conductor at adjacent ends of said conductors, and at least one output load connected between one pair of said conductors at the other ends thereof and substantially matching the impedance thereof, each of said means for connecting having negligible impedance over said band of frequencies.

3. The combination in accordance with claim 2 wherein said anode conductor and said grid conductor are coupled externally of said triode vacuum tubes.

4. The combination in accordance with claim 2 wherein said cathode conductor is a ground plane.

5. The combination in accordance with claim 2 wherein said grid conductor is a ground plane.

6. The combination in accordance with claim 2 wherein said at least one output load is connected between said anode conductor and said cathode conductor.

7. The combination in accordance with claim 2 wherein said at least one output load is connected between said cathode conductor and said grid conductor.

8. The combination in accordance with claim 2 wherein said at least one output load is a pair of output resistive loads, connected respectively between said cathode conductor and said grid and anode conductors.

9. The combination in accordance with claim 2 wherein inductive coupling exteriorly of said tubes and supplementary to that inherently present between said grid and anode conductors is provided between said grid and anode conductors.

10. The combination in accordance with claim 9 wherein said coupling contributes to directional coupling effects as between said anode and grid conductors.

11. The combination in accordance with claim 2 wherein said conductors contain only distributed values of inductance and capacity.

12. The combination in accordance with claim 2 wherein input terminals for sources of input signals having components over a substantial portion of the band 0–1000 mc. are provided between said grid-cathode conductors at the reverse and output terminals thereof.

References Cited in the file of this patent

UNITED STATES PATENTS

| | | |
|---|---|---|
| 2,172,354 | Blumlein et al. | Sept. 12, 1939 |
| 2,263,376 | Blumlein et al. | Nov. 18, 1941 |
| 2,485,559 | Brown | Oct. 25, 1949 |
| 2,593,948 | Wiegand et al. | Apr. 22, 1952 |
| 2,714,135 | Leyton | July 26, 1955 |

FOREIGN PATENTS

| | | |
|---|---|---|
| 318,720 | Great Britain | Sept. 12, 1929 |
| 460,562 | Great Britain | Jan. 25, 1937 |
| 890,345 | France | Nov. 2, 1943 |

OTHER REFERENCES

Article: "Distributed amplification," by Ginzton et al., Proceedings of the I. R. E., August 1948, pp. 956–969.

Article: "200 mc. traveling-wave chain amplifier," by Rudenberg et al., Electronics, December 1949, pp. 106–109.

Article: "Distributed amplification," by Cormack, Electronic Engineering, vol. 34, issue 290, pages 144–147, published April 1952.